Nov. 10, 1942.   Z. P. CANDEE ET AL   2,301,682
REDRAW PRESS
Original Filed April 10, 1937   10 Sheets-Sheet 1

Fig.1.

INVENTORS
Zenas P. Candee
Jesse B. Burton,
BY H. G. Manning
ATTORNEY

Nov. 10, 1942. Z. P. CANDEE ET AL 2,301,682
REDRAW PRESS
Original Filed April 10, 1937 10 Sheets-Sheet 2

INVENTORS
Zenas P. Candee
Jesse B. Burton.
BY
H. G. Manning
ATTORNEY

Nov. 10, 1942.    Z. P. CANDEE ET AL    2,301,682
REDRAW PRESS
Original Filed April 10, 1937    10 Sheets-Sheet 8

INVENTORS
Zenas P. Candee
Jesse B. Burton.
BY
H. G. Manning
ATTORNEY

Nov. 10, 1942. Z. P. CANDEE ET AL 2,301,682
REDRAW PRESS
Original Filed April 10, 1937 10 Sheets-Sheet 9

INVENTORS
Zenas P. Candee
Jesse B. Burton.
BY H. G. Manning
ATTORNEY

Nov. 10, 1942. Z. P. CANDEE ET AL 2,301,682
REDRAW PRESS
Original Filed April 10, 1937 10 Sheets-Sheet 10

INVENTORS
Zenas P. Candee
Jesse B. Burton.
BY
H. G. Manning
ATTORNEY

Patented Nov. 10, 1942

2,301,682

UNITED STATES PATENT OFFICE 2,301,682

REDRAW PRESS

Zenas P. Candee and Jesse B. Burton, Waterbury, Conn., assignors to The Waterbury Farrel Foundry & Machine Company, Waterbury, Conn., a corporation of Connecticut Application April 10, 1937, Serial No. 136,164
Renewed April 15, 1940

21 Claims. (Cl. 113—38)

This invention relates to drawing presses, and more particularly to a multi-step redrawing press adapted to draw a shell from a preformed cup by a plurality of sets of cooperating punches and dies—the product being automatically transferred successively from one punch and die set to the next, whereby a constant stream of completed shells will flow from the machine when it is in operation.

The redraw press of the present invention is especially adapted for producing a seamless cup-shaped cylindrical shell having relatively thin metal walls for use in the manufacture of cans to contain such commodities as soup, vegetables, beer, or the like. Due to the comparatively large size of such cans and the large number of operations required in their manufacture, a redraw press built in accordance with the usual machine design practice would necessarily be massive in structure, and would require an extremely heavy frame-work and numerous tie rods for the machine bed. Such a redraw press would be cumbersome and heavy, inconvenient to efficiently operate, substantially prohibitive in cost, and expensive to operate and repair.

In accordance with the present invention, the above and other disadvantages have been avoided.

One object of this invention is to provide an improved redraw press of the above nature operating on the multi-step principle.

Another object is to construct such a press with a plurality of replaceable frame units which may be selectively combined to produce various articles of similar form, requiring a variable number of operations, depending upon the particular form and material of the product desired.

Still another object is to provide a multiple unit redraw press of the above nature in which each unit includes a plurality of sets of punches and dies, all of which are operated with the same length of stroke from a common drive mechanism.

A further object is to provide a redraw press of the above nature having means operated by the common drive for transferring the products from station to station.

A further object is to provide a stepped redraw press of the above nature having a set of sliding transfer members located on different levels and a different mechanism for obtaining a straight feed of the products through another unit.

A further object is to provide an automatic safety mechanism for preventing injury to the machine in case of accidental breakage of a punch or imperfect formation of a product, said safety mechanism being associated with the transfer mechanism.

A still further object is to provide a redraw press of the above nature which will be relatively simple in construction, inexpensive to manufacture and operate, easy to manipulate, compact, and very efficient and durable in use.

With the above and other objects in view, there have been illustrated in the accompanying drawings two forms in which the invention may be conveniently embodied in practice.

Referring now to the drawings in which like reference characters denote corresponding parts throughout the several views, the machine or press herein illustrated is adapted to redraw, form, and trim a preformed metal cup 10 (see Fig. 6) in successive operations by means of a plurality of sets of cooperating punches and dies arranged in a line.

Each set of punches and dies constitutes a station and nine of such stations are provided. The products produced at the successive stations are clearly shown in Fig. 5, being indicated by the numerals 11 to 19, respectively, the last product being the completed shell 19.

At each of the first six stations, drawing operations are performed to elongate the metal cup 10 and to reduce its diameter and wall thickness. At the sixth station the product 16 will have a narrow enlarged annular rim 20 left at the open top thereof which was not acted upon by the punch and die at this station. At the seventh station the product 17 will be shaped accurately to size, and the closed bottom is squared, as is also the shoulder between the rim 20 and the body of said product. At the eighth station the center of the closed bottom of the product 18 is offset inwardly, as illustrated at 21, and at the ninth or last station, the open rim 20 is severed and blown out of the machine by compressed air in one direction, while the completed shell 19 is directed out of the machine in another direction.

The operations just described are adapted to be performed by the successive action of the sets of punches and dies, all of which are vertically reciprocated by suitable common driving mechanism to be described later.

The punches of the press, as herein illustrated, are arranged in three groups or units. The first three punches (the first unit) which form the products 11, 12 and 13 (Fig. 5) are given a shorter stroke than those of the other two units, which have the same length of stroke. As shown in Fig. 6, the sets of punches and dies of the first and second groups or units which include stations No. 1 to No. 5, inclusive, are regularly stepped downwardly and the product formed by each punch is forced downwardly through the cooperating die and stripped therefrom in such a manner as to be disposed on a level with the next succeeding die, while the punches and dies constituted by stations No. 6 to No. 9 are all arranged in a straight line on the same level.

In order to carry the products from station to station, two forms of transfer mechanism are provided, one for the stepped down arrangement of the first two groups, and another for the third group or "straight line" arrangement. Both transfer mechanisms are operated from a common vertical drive shaft which is driven from the main power mechanism by suitable gearing connected in timed relation with the punch reciprocating mechanism. A knock-out mechanism is also provided to remove the products from the dies of the straight-line stations, and said mechanism is driven by cam means in timed relation with the punch reciprocating mechanism. A single electric motor 22 (Figs. 2 and 4) supplies power for all of the above mentioned mechanisms, the respective driving connections being shown in Figs. 2, 3, 4, 10 and 11.

*Machine drive*

Figure 8:
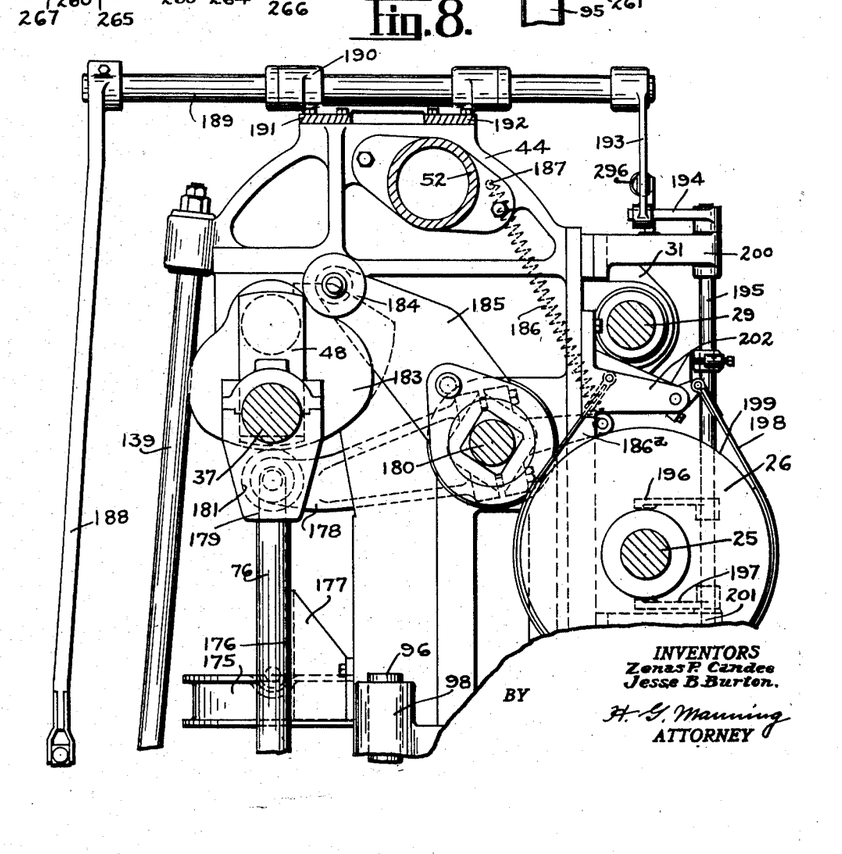
Fig. 8 is a vertical sectional view of the upper part of the third unit, taken generally on the line 8—8 of Fig. 1.
Figures 10, 11:
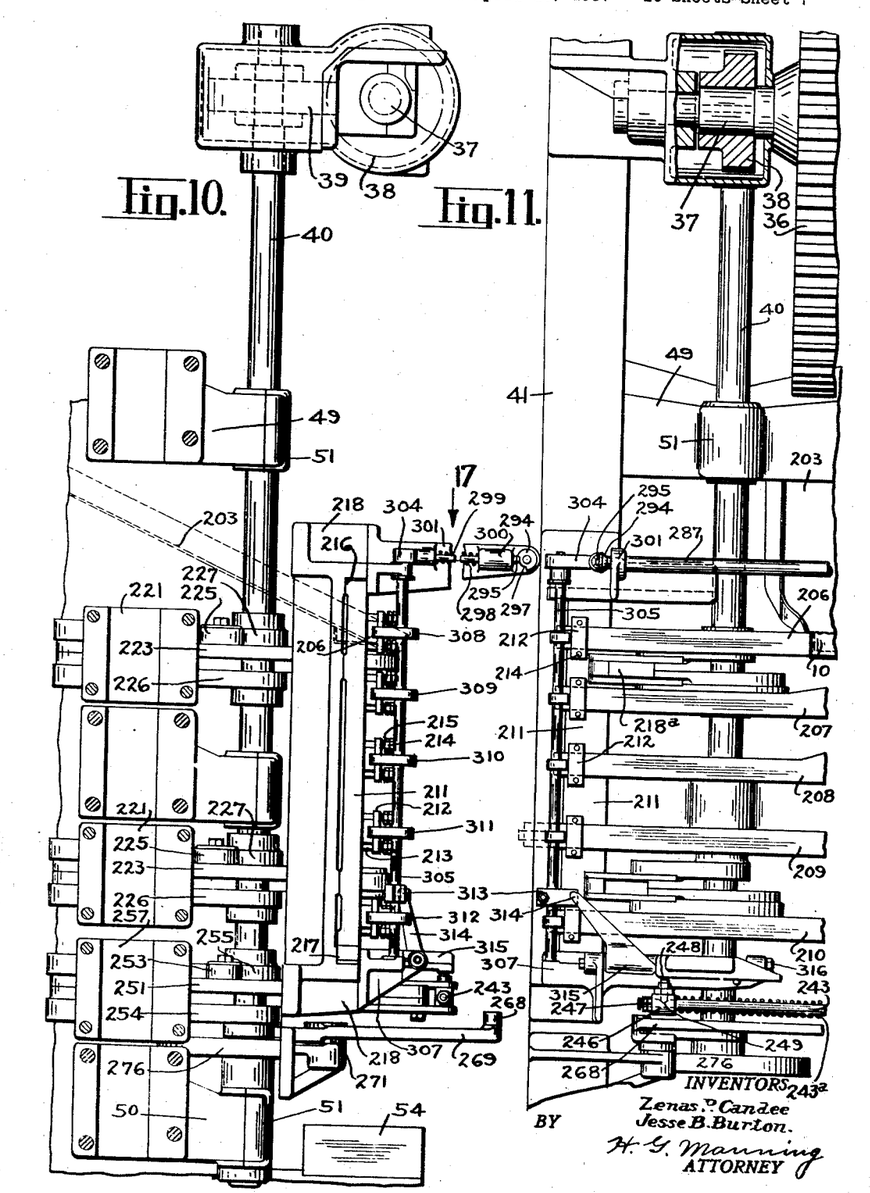
Fig. 10 is an end view of the common product transfer mechanism and its drive—one of the frame members being omitted to show the construction thereof.
Fig. 11 is a front view of the transfer mechanism shown in Fig. 10.

The motor 22 is connected by a belt or chain 23 to a pulley 24 secured to a horizontal clutch-shaft 25, having a clutch 26 (see Figs. 3, 4, and 8), which connects it with a pinion 27 which meshes with a gear 28 secured on a horizontal back-shaft 29. The clutch shaft 25 is journaled in brackets 30 and the back shaft 29 is journaled in brackets 31, said brackets being secured to frames at the rear of the machine.

Figure 2:
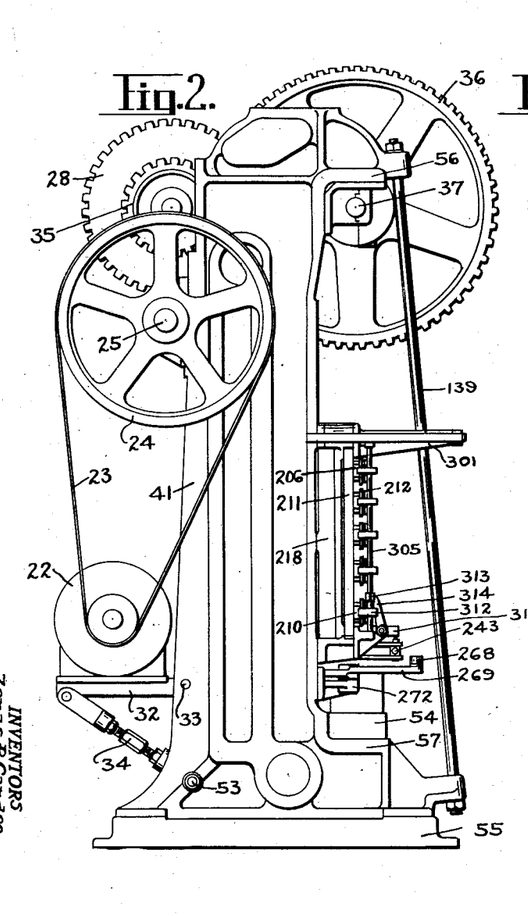
Fig. 2 is a left-hand side view of the same.
Figure 3:
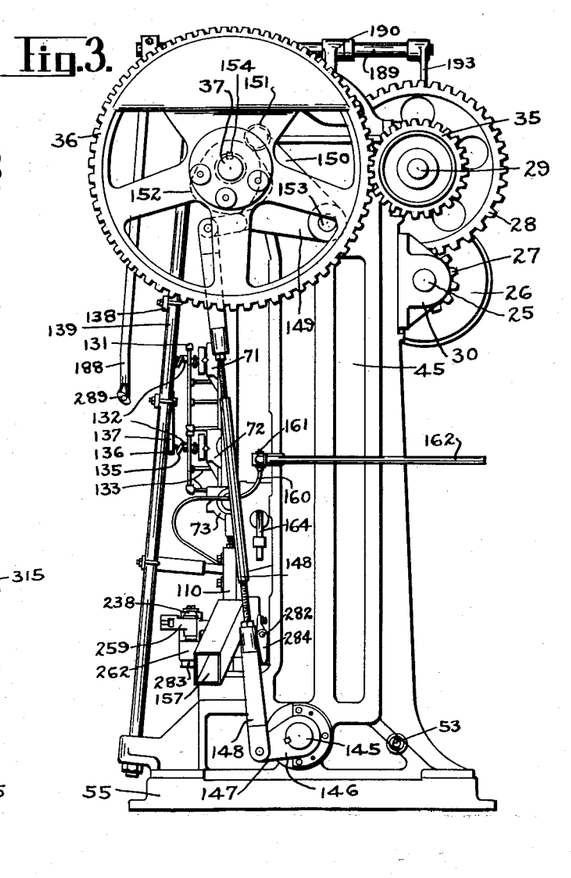
Fig. 3 is a right-hand side view thereof.
Figure 4:
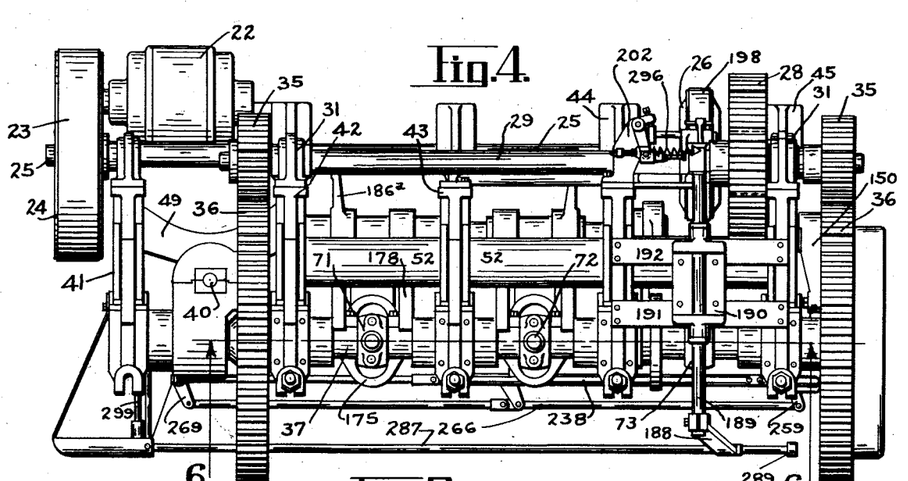
Fig. 4 is a top plan view of the same.
Figures 7, 9:
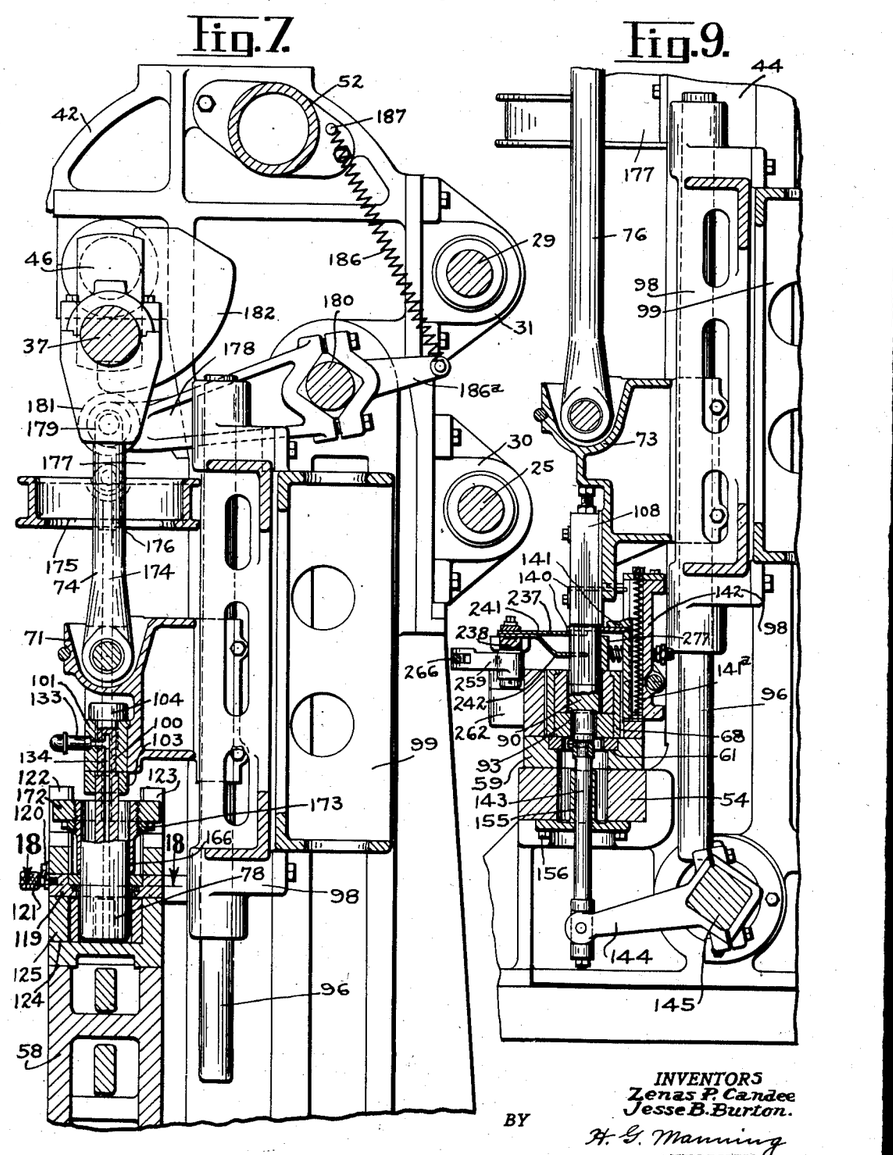
Fig. 7 is a vertical sectional view of the second punch of the first unit, taken generally on the line 7—7 of Fig. 1.
Fig. 9 is a vertical sectional view of the lower part of the third unit, taken generally on the line 9—9 of Fig. 1—Fig. 9 being substantially a continuation of Fig. 8.

The motor 22 is supported upon a bracket 32 (Fig. 2) which is pivoted at 33 to one of the frames, whereby it may be adjusted to control the tightness of the belt 23 by means of a turnbuckle 34 secured to the outer end of said bracket 32. Pinions 35 are secured on each end of the back-shaft 29 (see Fig. 4), and said pinions 35 mesh with a pair of large gears 36 secured upon the ends of a horizontal crank shaft 37 (Figs. 2, 3 and 7). A spiral gear 38 is secured on one end of the crank-shaft 37 and meshes with another spiral gear 39 secured to the upper end of a vertical shaft 40 adapted to drive the product transfer mechanism. By means of the above construction, it will be seen that the entire driving mechanism may be readily controlled by the clutch 26 and all of the parts thereof are conveniently accessible for assembly, adjustment, or repair.

*Machine assembly*

Figure 1:
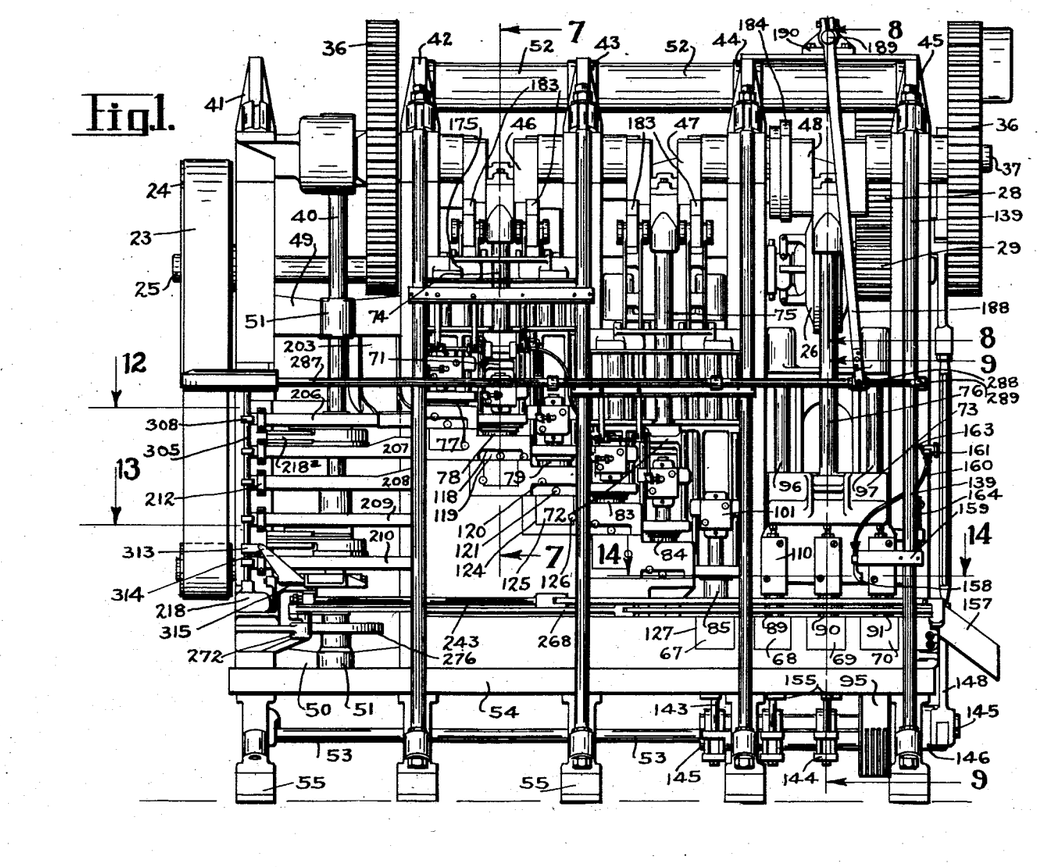
Fig. 1 is a front elevational view of a redraw press embodying the features of this invention.

In order to support the three units or groups of cooperating punches and dies, provision is made of a plurality of generally similar upright parallel spaced-apart frames or standards 41–45, inclusive (five in this instance), see Fig. 1. The spaced-apart frames 41 and 42 provide a space for the vertical shaft 40 and the associated transfer mechanisms. The crank-shaft 37 is journaled in frames 42, 43, 44 and 45—its left-hand crank portion 46 being disposed between the frames 42 and 43 for operating the first redrawing unit. The second crank portion 47 of the crank shaft 37 is disposed between the frames 43 and 44 for operating the second redrawing unit. Similarly, a third crank portion 48 of the crank-shaft 37 is disposed between frames 44 and 45 and operates the third redrawing unit.

The frames 41 and 42 are separably tied together by upper and lower horizontal cross-beams 49 and 50 (Fig. 1), which are both provided with suitable bearings 51 for the vertical shaft 40. The pairs of frames 42 and 43; 43 and 44; 44 and 45 are separably tied together at their upper portions by identically shaped cross-beams 52. All of the frames are separably tied together at the bottom by a single cross-bar 53 extending the entire length of the machine, in addition to a one-piece bed plate 54. Each of the above mentioned frames rests upon a foot piece 55 which may be secured to the floor or other support.

The frames or standards 41–45, inclusive, are generally identical in form, preferably being cast from the same pattern and differing only in minor details, such as the location and number of screw or bolt holes required for association with the brackets and other parts of the machine.

By means of the above identical construction of the frames and cross-beams, the machine may be enlarged whenever it is desired to form more units, or, if less units are required, one or more of said frames may be omitted without requiring the construction of expensive special machine frames for such purposes. This construction facilitates the manufacture of redraw presses of various sizes and enables the larger sizes of such presses to be easily handled and assembled by units.

As shown in Fig. 2, each of the vertical standards 41–45 has a forwardly extending downwardly directed overhanging shoulder or shelf 56 at its upper end and a forwardly extending upwardly directed shoulder or shelf 57 adjacent its base. The single bed plate 54 rests on and is secured to said lower shelves 57 as by bolts not shown.

In order to form supports for the dies, the bed plate 54 supports a bolster, herein shown as comprising upper and lower sections 58 and 59, respectively, as best illustrated in Fig. 6. The upper section 58 is stepped in form, while the lower section 59 is straight-line in form. Each step of the upper bolster section 58 is provided with a die block supporting surface 60, and the lower bolster section 59 is provided with a plurality of spaced apart transversely extending die block seats 61.

Separate die blocks 62–66, inclusive, are provided and are mounted upon the stepped surfaces 60 of the upper bolster section 58, respectively; and separate die blocks 67–70, inclusive, are provided and are mounted one on each of the seats 61 provided in the lower straight-line bolster section 59.

The crank portions 46, 47 and 48 are respectively connected to reciprocating gates 71, 72 and 73 by connecting bars 74, 75 and 76. The first gate 71 supports and actuates three punches 77, 78 and 79, which are in stepped arrangement to correspond and cooperate respectively with the first group of three dies 80, 81 and 82 held respectively in the die blocks 62, 63 and 64. The second gate 72 supports and actuates three punches 83, 84 and 85 which are arranged in stepped relation to correspond and cooperate respectively with the second group of three dies 86, 87 and 88 held respectively in the die blocks 65, 66 and 67. The third gate 73 also supports and actuates three punches 89, 90 and 91 which are in straight-line arrangement to correspond and cooperate respectively with the third group of dies 92, 93 and 94 held respectively in the die blocks 68, 69 and 70.

Figure 5:
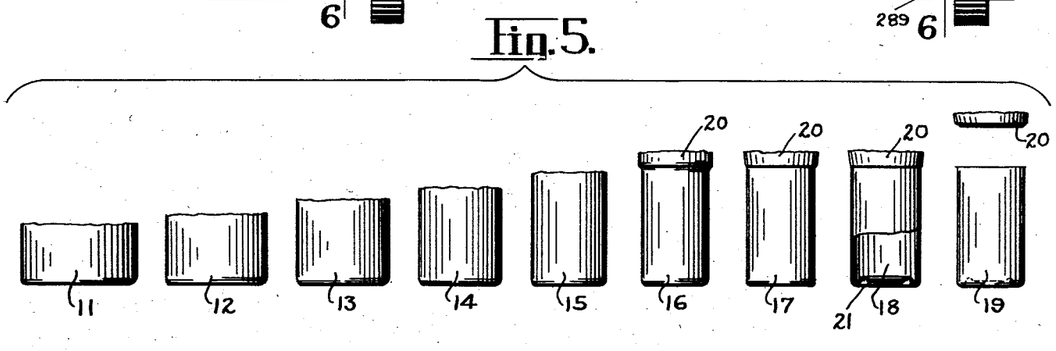
Fig. 5 is a view showing the appearance of the products from the different punches and dies arranged in accordance with the sequence of the operations performed at the various stations of the redraw press.
Figure 6:
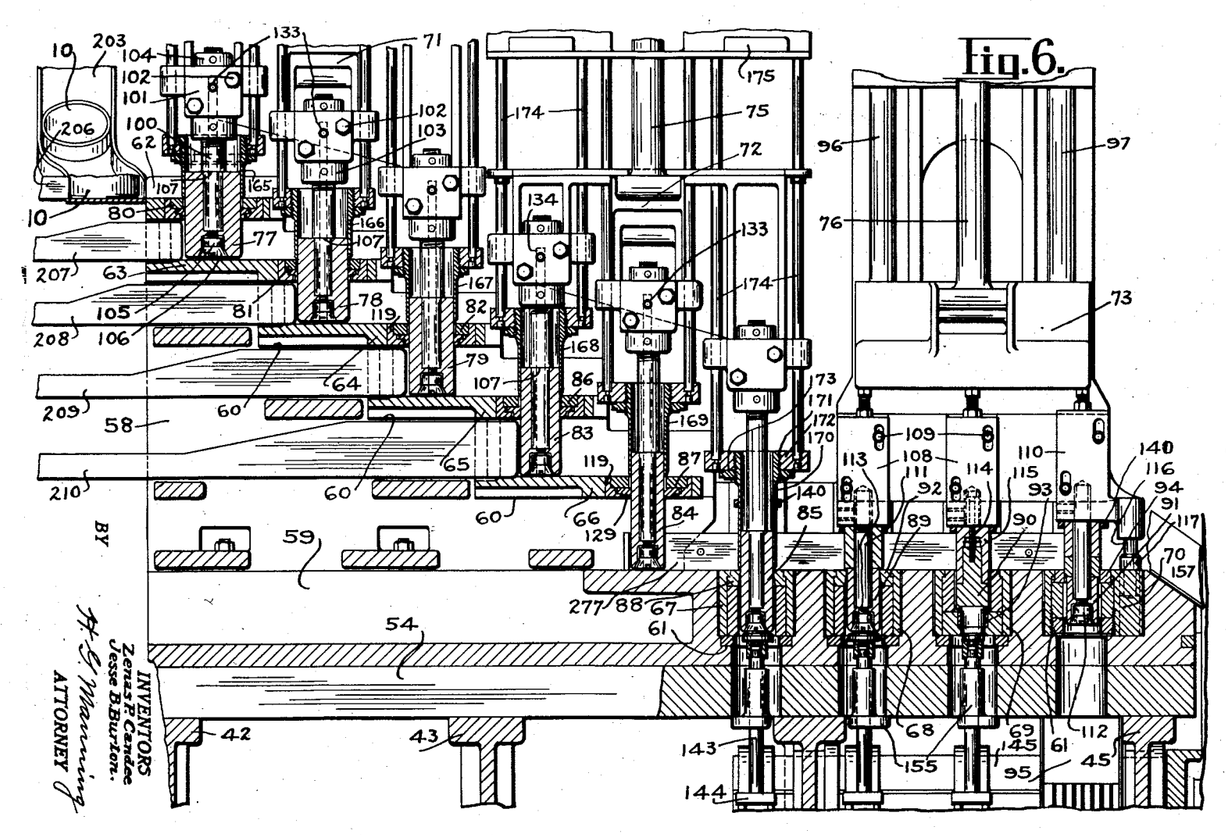
Fig. 6 is a view in vertical section of the punches and dies used with the press, taken generally on the line 6—6 of Fig. 4 looking in the direction of the arrows.
Figure 12:
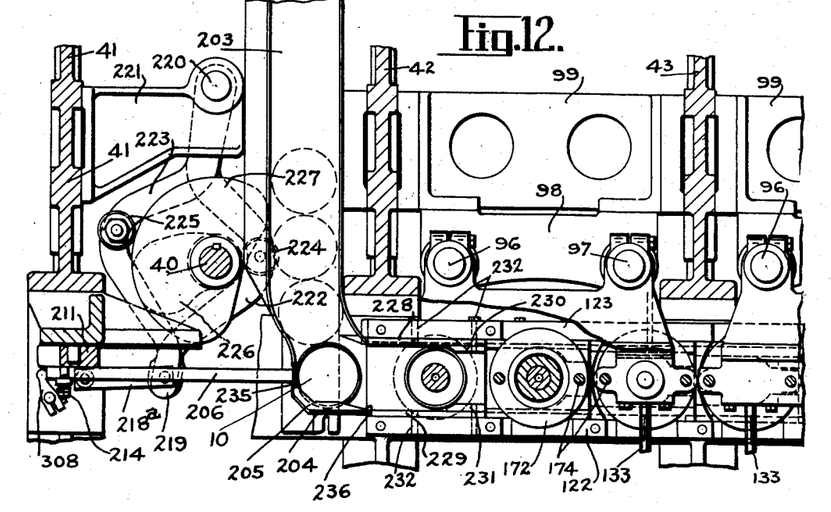
Fig. 12 is a fragmentary horizontal sectional view taken generally on the line 12 of Fig. 1, looking downwardly.

Due to the above arrangement, on each stroke of the press caused by one revolution of the crank shaft 37, one product will be drawn or otherwise acted upon by each of the cooperating punches and dies as shown in Fig. 5, and a completed shell 19 will be delivered from the machine into a delivery chute 95. The gates 71, 72 and 73 are each secured to and supported upon a pair of spaced apart vertical rods or posts 96 and 97 (see Figs. 1, 7, 9 and 12) which move with the respective gates as they are reciprocated by the respective crank portions 46, 47 and 48 when the crank-shaft 37 is rotated. Each pair of posts 96 and 97 is slidably mounted in a guide bracket 98 which is secured to a horizontal center tie beam 99 secured to and extending between the frames of each press unit, as shown in Figs. 9 and 12.

Each of the punches 77, 78, 79, 83, 84 and 85 is in the form of a sleeve (see Fig. 6) through which a connecting rod 100 extends upwardly, and said rod also extends up through a punch holder block 101 which is secured to the respective gate by bolts 102. Lock nuts 103 and 104 adjustably secure the rods 100 to the punch holders 101. The punch holders 101 are arranged on the respective gates 71 and 72 so as to successively step the punches 77, 78, 79, 83, 84 and 85 downwardly in agreement with the stepped arrangement of the dies 80, 81, 82, 86, 87 and 88, respectively. At the lower end of each rod 100, provision is made of a nut 105 having a beveled head 106 engaging the lower end of the respective punch to hold the same upon the rod 100 and to clamp the upper end of said punch against a shoulder 107 formed on the rod.

The punches 89 and 90 of the third unit are each connected to punch holding blocks 108 which are adjustably secured to the gate 73 by bolts 109, and the punch 91 is connected to a block 110 which is similarly adjustably secured to the gate 73. Punches 89 and 91 are tubular, and each has a rod 111 passing upwardly therethrough and threaded into the respective blocks 108 and 110. A bevel headed nut 112 clamps each of the respective sleeve-like punches 89 and 91 against a shoulder 113 formed on the rods 111.

The punch 90 is secured to the block 108 by a bolt 114 which draws it upwardly against a depending stud 115 secured to the block 108. The punch 90 is provided with a suitable bottom contour which, in cooperation with the die 93, forms the desired bottom shape 21 for the product. The block 110 is provided with a pair of guide posts 116, shown in Figs. 6 and 14, which cooperate with bushings 117 provided in the die block 70 to insure accuracy in alinement of the punch 91 with the die 94.

Accessibility to dies and products

In order to permit the dies 80, 81, 82, 86 and 87 to be readily removed, the die blocks 62–66 are provided with front openings 118 (see Figs. 1, 7 and 13), through which the die holding plates 119 may be readily removed from said blocks, the plates 119 being each held in place by collared bolts 120. A manually engageable handle or knob 121 is provided on the front of each plate 119 by means of which said plate may be conveniently inserted or removed from the die block (see Figs. 1, 6, 7, 19 and 20). Each of the dies 80, 81, 82, 86 and 87 is in the form of a disc and rests in a depression formed in its respective die holding plate 119. Vertical front and rear spaced flanges 122 and 123 respectively are formed on each of the die blocks and overlie the dies to hold them against vertical removal from the plates 119 when they are inserted within said blocks.

Access to the products 11, 12, 13, 14 and 15 formed by the dies 80, 81, 82, 86 and 87 respectively is provided, as shown in Figs. 1 and 7, by means of an opening 124 in the front flange 122 of each die block 62, 63, 64, 65 and 66, which extends backwardly beneath the preceding die holding plate 119. The openings 124 are covered by a removable plate 125 secured thereto by bolts 126. The removal of any one of the plates 125 allows convenient access to the space below the preceding die for the removal of products which may be distorted or stuck therein, it being understood that the products formed at each station will be forced downwardly through the die onto the upper surface of the next succeeding die block below it. The die holding plates 119 are shown herein as resting upon and between the flanges 122 and 123 of the next succeeding die block and directly over the cover plates 125.

In order to permit the dies 88, 92, 93 and 94 of the straight line section of the press and their corresponding die blocks 67, 68, 69 and 70, inclusive, to be readily removed (see Figs. 1, 6 and 14), sockets 127 are formed in the lower bolster section 59, through which sockets said dies and die blocks may be slid onto the respective die block seats 61. The die blocks 67–70 are secured in place by bolts 128 extending downwardly into the bolster section 59, and the removal of these bolts permits the forward removal of said die blocks.

*Means for stripping products from punches*

Figures 15, 17, 18:
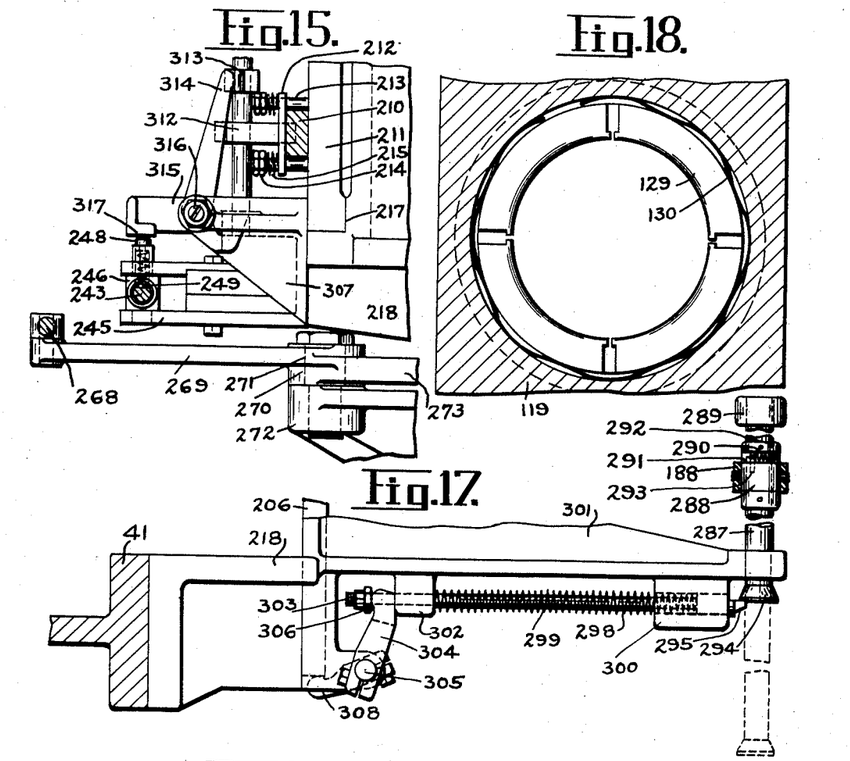
Fig. 15 is an enlarged end view, partly in section, of the "step down" transfer mechanism, looking in the direction of the arrows 15 in Fig. 13.
Fig. 17 is an enlarged top plan view of a portion of the safety mechanism, looking in the direction of the arrow 17 in Fig. 10.
Fig. 18 is an enlarged horizontal sectional view of the stripper mechanism, taken on the line 18—18 of Fig. 7, looking downwardly.

The means whereby the various products are stripped from the punches 77, 78, 79, 83 and 84 is most clearly shown in Fig. 18. For this purpose, provision is made of a split ring 129 (herein shown as being split into four parts), having a circular sinuous spring 130 surrounding the same (see Fig. 18). The spring 130 is tensioned to constantly urge the parts of the ring 129 together whereby the opening therein will decrease in diameter after a product has been pushed through the same by the respective punch. The closing together of the parts of the ring 129 will cause it to be engaged by the upper edge of the product when the punch rises during its upward stroke, whereby the product will be held beneath said ring 129. The stripping action of the ring 129 is assisted by an auxiliary compressed-air apparatus consisting of a pipe 131 (see Fig. 3) leading from a suitable source of compressed air to suitable valves 132 mounted on the gates 71 and 72, one valve being provided for each of the punches 77, 78, 79, 83 and 84. From each valve a pipe 133 leads to the respective punch holding block 101.

In order to direct a blast of compressed air downwardly against the bottom of each of the products to assist in forcing it from the respective punch, each of the punch connecting rods 100 is provided with a vertical bore 134 (see Fig. 7) through which the air may flow. Each valve 132 is provided with an inclined actuating finger 135 which is engaged by an arm 136 extending rearwardly from a depending supporting arm 137 fixedly secured to a cross-bar 138 fastened to and extending between elongated supporting rods 139 extending upwardly from the base of each frame 42, 43 and 44 to its overhanging shelf 56. The arrangement is such that at each upward stroke of the punches, the valves 132 will be opened whereby compressed air will impinge with considerable force upon the product and assist the stripper ring 129 in removing said product from its punch without distorting the product.

The products are stripped from the punches 85, 89 and 90 and the scrap rim 20 of the completed product from the punch 91 by means of stripper rings 140 (see Figs. 9 and 14), which are mounted on and extend forwardly from the vertical holders 141. The holders 141 are mounted for vertical sliding movement under the upward urge of a coiled spring 141a in a vertically disposed frame 142, and said holders 141 are shown in full lines in Fig. 9 in their lowermost positions under pressure of the gate 73, the uppermost position of said rings 140 being shown in dotted lines.

The products 16, 17 and 18 formed by the punches 85, 89 and 90 are removed upwardly from the dies by knock-out rods 143 (see Figs. 1, 6 and 9), each of which rods are carried by and upon the end of an arm 144. Each of the arms 144 is rigidly mounted upon a rock-shaft 145 which extends to the right-hand side of the press and has a crank arm 146 secured thereto at its outer end. The free end 147 of the crank arm 146 is connected by a suitable upwardly extending link mechanism 148 (see Fig. 3) to a bell crank 149 pivoted to the adjacent frame 45 at 153. One arm 150 of the bell crank 149 carries a roller 151 which is constantly urged into engagement with a cam 152, as by gravity acting on the parts connected thereto. The cam 152 is secured to the crank shaft 37 adjacent the gear 36 by a key 154. The cam 152 is timed to rock the shaft 145 through the above mechanism to eject the products from the respective dies when the punches are moved upwardly. The knock-out rods 143 are guided by flanged bushings 155 secured to the underside of the bed plate 54 by bolts 156.

No knock-out or ejector is necessary to remove the completed shell formed by the cut-off punch 91 and die 94, as said shell will drop through the die block 70 by gravity into the delivery chute 95. After being stripped from the punch 91, the rim of scrap 20 is blown from the machine into a scrap chute 157 by a stream of compressed air directed thereagaints by a nozzle 158. The nozzle 158 is mounted on an arm 159 extending outwardly from the rod 139 associated with the frame 45. A tube or pipe 160 connects the nozzle 158 to a valve 161 which in turn is connected to a source of compressed air supply by a pipe 162. An actuating finger 163 provided for the valve 161 is adapted to be engaged by a finger 164 extending from the gate 73 to open the valve when the gate is raised.

*Product holding-down and supporting sleeves*

The mechanism for holding down and supporting the products at each of the drawing stations 1–6, inclusive, while the respective punches 77, 78, 79, 83, 84 and 85 are operating thereon during their downward strokes, includes a plurality of sleeves 165–170, inclusive. Each of the sleeves 165 to 170 is fitted to freely slide upon the corresponding punch and is of the proper outside diameter to enter into the product received and the next preceding punch except in the case of the first sleeve 165 which, of course, enters the cup 10. Each sleeve has an exteriorly threaded upper end portion 171 whereby it is secured to a horizontal plate-like sleeve holder 172—being secured thereto by a threaded lock ring 173 (see Figs. 1, 6, 7 and 12).

The plates or sleeve holders 172 are each secured to the ends of a pair of rods 174 which extend upwardly therefrom through suitable openings in the punch holding blocks and gates and are connected to yokes 175 (common for each unit) and which surround the respective gate connecting bars 74 and 75 of the first two units. Each yoke 175 is slidingly mounted upon ways 176 formed on brackets 177, one of which extends forwardly from each of the frames 42, 43 and 44—the yokes 175 extending between adjacent frames. Each of the yokes 175 is connected to a cross-arm 178 by a link 179 (see Figs. 7 and 8), and each arm 178 is clamped to a rock-shaft 180, as by bolts. Rocking movement is imparted to the shaft 180 to move the sleeves 165–170 downwardly in proper time relation with respect to the stroke of the punches 77, 78, 79, 83, 84 and 85 by means of a roller 181 carried by at least one of the arms 178. The roller 181 rides upon a cam 182 mounted on the crank-shaft 37 and causes the respective sleeves to engage and enter the cup or product received from the next preceding station holding it in alinement with its corresponding punch and die, and supporting it while said punch is forcing it through its co-operating die. As shown in Fig. 6, the sleeves 165–170 are arranged in stepped down relation to agree with the stepped arrangement of the punches and dies.

In order to raise the sleeves 165–170 in proper timed relation with the machine operation, provision is made of another cam 183 also mounted upon the crank-shaft 37 (see Fig. 8), and acting upon a roller 184 carried by an arm 185 also secured to and extending from the rock-shaft 180. Coiled springs 186 are secured at one end to an arm 186a forming a rearward extension of the arms 178, and at the other end 187 to an adjacent frame to constantly urge the roller 184 against the cam 183. The cam 183 acts to raise the sleeves 165–170 sufficiently to permit the placement of the cup or product from the next preceding punch and die under the punch at each station. The cams 182 and 183 are also in timed relation to permit the sleeves to be abruptly moved downwardly in advance of the downward stroke of the punch and to hold the products in place while the punch acts. The cam 183 serves to raise the sleeve as soon as the punches have completed their strokes.

For the purpose of balancing the action of the arms 178 through the links 179 (Figs. 7 and 8), provision is made of four of such arms 178, one being disposed on each side of each of the connecting bars 74 and 75. Four cams 182 are also provided to act upon the rollers 181 carried by the arms 178—said cams being disposed one on each side of the connecting bars 74 and 75. This arrangement insures smooth action on the part of the sleeves 165–170, prevents cramping of the yokes 175 on the ways 176, and distributes the twisting strains upon the shaft 180.

*Control mechanism*

After the motor 22 has been energized and has attained its full speed, the clutch 26 will be actuated to drivingly connect the clutch-shaft 25 with the pinion 27, whereby, by means of the gear 28, the back-shaft 29, the pinions 35, the gears 36, and the crank-shaft 37 will be rotated. The gates 71, 72 and 73 will thus be caused to reciprocate the punches, and drive the cam 152 (Fig. 2) which actuates the knock-out rods 143 and the cams 182 and 183 (Figs. 7 and 8) which control the cam-holding sleeves 165–170.

The clutch 26 is adapted to be manually actuated by a depending clutch lever 188 (see Figs. 1, 3, 4 and 8), which is connected at its upper end to the front end of a cross-shaft 189, journaled in a bracket 190, mounted upon cross-bars 191 and 192 extending between and mounted on the upper surface of the frames 44 and 45.

A short downwardly extending arm 193 secured to the rear end of the cross-shaft 189 is slidably connected by an arm 194 to a vertical shaft 195.

A pair of parallel clutch shifting arms 196 and 197 (Fig. 8) are secured to the rockable shaft 195 and operably engage the slidable part of the clutch 26 to shift the same into and out of clutching engagement with the clutch part connected to the pinion 27 when the shaft 195 is rocked. At the same time a brake band 198 is tightened about a drum 199 formed on the outside casing of the clutch 26 to stop its rotation and through it the rotation of the parts driven thereby. A pair of brackets 200 and 201 (Fig. 8) extend rearwardly from the frame 44 to support the vertical shaft 195, and another bracket 202 secured to said frame 44 and extending to midway between said frames 44 and 45 supports the brake band 198 and its actuating mechanism.

*Product transfer and feeding mechanism*

Referring particularly to Fig. 12, provision is made of a feed chute 203 containing a plurality of cups 10—being adapted to rest against a front wall 204 below a flange 205 extending rearwardly over an edge of the cup, which is disposed beneath it.

In order to transfer the products from beneath the die at one station to a position in alinement with the holding sleeve, punch, and die of the next succeeding station, provision is made of a plurality of longitudinally movable product pushers 206–210, inclusive (see Figs. 6, 10, 11 and 15). The pushers 206–210 are arranged one above the other, each being in alinement with the upper surfaces of respective die blocks along which the products are to be moved.

The outer end of each of the product pushers is frictionally clamped against a common pusher slide 211 by clamp plates 212 through which extend stud bolts 213 screwed into the slide 211 (see Fig. 15). Lock nuts 214 are provided to hold the plates 212 in abutment with the bolts 213, and springs 215 are provided between the nuts 214 and the plates 212 to yieldingly press the plates 212 upon the ends of the pushers, whereby any pusher may slip in case the product being pushed thereby becomes accidentally stuck and not readily moved. The slide 211 is guided at its top and bottom edges in ways 216 and 217 (Fig. 10) formed respectively at the upper and lower portions of a bracket 218 mounted upon the front of the frame 41 (see Figs. 10, 11 and 12). The slide 211 is moved in timed relation with the stroke of the punches by means of horizontal links 218a connecting said slide to a pair of spaced apart arms 219 pivoted at 220 to brackets 221 secured upon the inside surface of the frame 41 (see Fig. 12).

Each arm 219 is provided with a pair of opposed spaced apart bowed portions 222 and 223 having rollers 224 and 225 respectively mounted thereon. These rollers respectively engage and ride upon the surface of a pair of plate cams 226 and 227 secured to and rotatable with the vertical shaft 40 (see Fig. 10). Each cam 226 is designed to move the slide 211 and with it the pushers 206–210 in the direction to cause them to move the products 11–15, inclusive, in unison from one station to the next succeeding one, it being understood, of course, that the products will first have been stripped from the respective punches. Each cam 227 is shaped to return or retract the pushers into a position to again engage the respective products (see Fig. 6).

Figure 13:
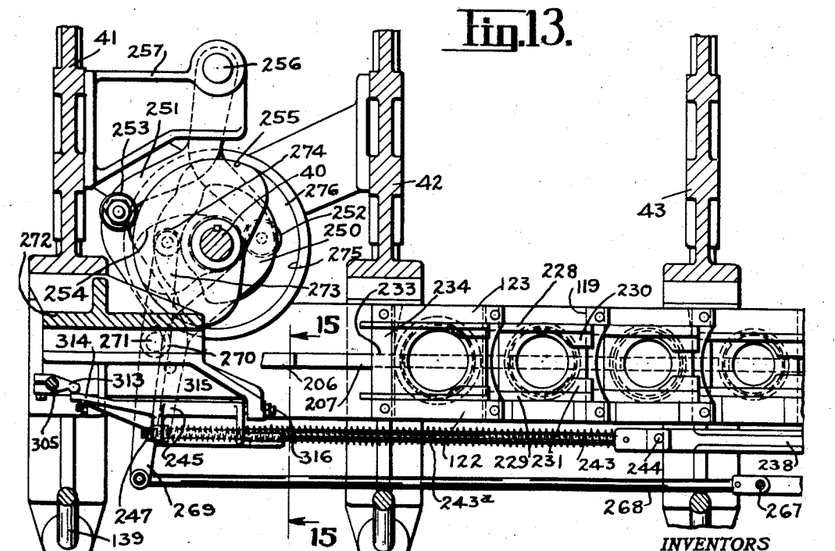
Fig. 13 is a similar fragmentary horizontal sectional view taken generally on the line 13 of Fig. 1.

As clearly shown in Figs. 12 and 13, the products 11–15, when being moved by the pushers 206–210 respectively, are guided at their sides by guide plates 228 and 229—their movement being limited by locating stops 230 and 231. The stops 230 and 231 are secured to the plates 228 and 229 which in turn are removably secured to the adjacent side flanges 122 and 123 of each die block by screws 232.

The forward ends of the pushers 207 to 210 are guided in a slot 233 formed in the front wall 234 of each of the die blocks 63–66 respectively (see Figs. 6 and 13), the front end of the pusher 206 being guided by a slot 235 formed in the cup feed chute 203 (see Fig. 12). The guide plates 228 and 229, which are adjacent the feed chute 203, form a continuation of the product path provided by a side opening 236 formed in said chute.

Figure 14:
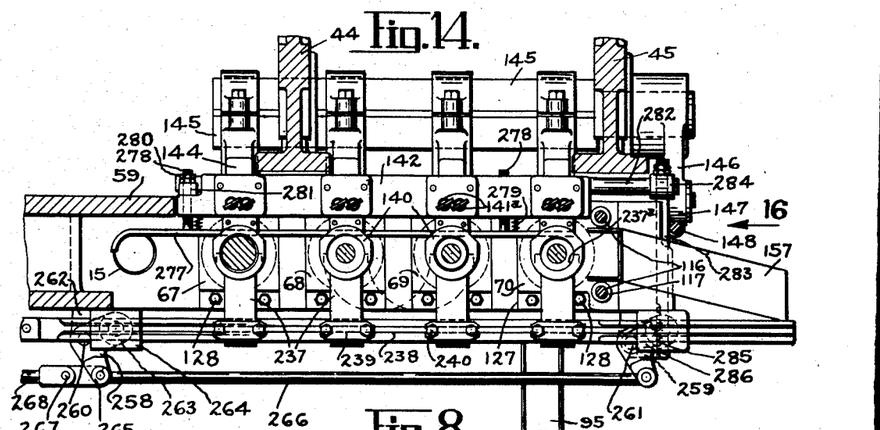
Fig. 14 is a similar fragmentary horizontal sectional view taken generally on the line 14—14 of Fig. 1, and showing a plan view of the "straight line" transfer mechanism.
Figure 16:
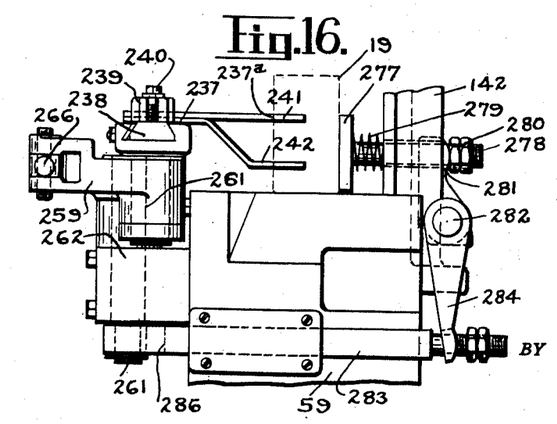
Fig. 16 is an enlarged end view of the straight line transfer mechanism, looking in the direction of the arrow 16 in Fig. 14.

The products 16–18 inclusive are transferred to the successive stations of the last unit of the redraw press after being ejected from the dies 88, 92 and 93 by the knock-out rods 143, associated therewith, by means of three double armed product-embracing fingers 237 (Figs. 9, 14 and 16). Each of the fingers 237 is clamped to a shift bar 238 by a plate 239 and bolts 240, and at its forward end is bifurcated at 237a to form curved sides to embrace the product. The fingers 237 are each provided with vertically spaced apart portions 241 and 242 so as to engage the product at spaced apart points and thus prevent tilting of the product as it is moved from one station to the next. The fingers 237 are given an intermittent sliding movement by a straight-line movement of the shift bar 238 to transfer the products in a straight line along a guide plate 277. The fingers 237 are then moved back into their initial positions by means of a forward and rearward transverse movement of the bar 238 to carry the fingers 237 into and out of product embracing positions. The resultant curved path through which the fingers 237 move when returning to their initial position is indicated by dotted lines in Fig. 14, wherein the fingers 237 are shown in full lines at the completion of their product transferring movement.

The shift bar 238 is given its straight line lengthwise movement by means of an elongated rod 243 connected to said bar by a pin 244 (Figs. 11, 13, 14 and 15). The rod 243 is connected at its other end to the end of an arm 245 and passes through a block 246 secured in the end of the arm 245, which is connected to the block 246 by means of nuts 247 screwed on the outer end of the rod 243. A spring-pressed pin 248 is also mounted in the block 246, extends through the same, and at its lower end releasably fits into a notch 249 formed at the end of the rod 243 adjacent the block 246. A spring 243a is coiled about the rod 243 and reacts against the block 246 and the end of the bar 238 to maintain the parts in operating position.

The arm 245, which is similar to the bowed arm 219, is provided with spaced apart opposing bowed portions 250 and 251 having rollers 252 and 253 respectively mounted thereon (see Fig. 13). There rollers respectively engage and ride upon the surfaces of cams 254 and 255, the surfaces of which are identical in shape with the cam surfaces of cams 226 and 227 respectively. The arm 245 is pivoted at 256 to a bracket 257 secured to the inside surface of the frame 41 and spaced below the bracket 221 (see Fig. 10). The cams 254 and 255 are secured to and rotatable with the vertical transfer shaft 40. The cam 254 is formed to move the fingers 237 from one station to the next succeeding one by shifting the bar 238 through the connection constituted by the arm 245, block 246, and the spring pressed pin 248. The cam 255, on the contrary, returns the fingers to their initial position for engagement with the products as they are ejected and stripped from the preceding punches.

The transverse movement for the bar 238 is obtained by the rocking movement of bell-cranks 258 and 259 (see Fig. 14), which are pivoted by pins 260 and 261 upon spaced apart brackets 262 secured to the front of the lower bolster section 59 (see Figs. 9 and 14). One arm 263 of each of the bell-cranks 258 and 259 is connected to one of a pair of blocks 264 on which the bar 238 is slidably mounted and by which it is supported from the brackets 262. The other arm 265 of each of the bell-cranks is connected to a rod 266 which is connected at 267 to another rod 268. The rod 268 (see Figs. 10, 13 and 15) is connected to one arm 269 of a lever 270 pivoted at 271 to a bracket 272 mounted on the frame 41. The other arm 273 of the lever 270 has a roller 274 thereon, which roller is arranged to follow a cam groove 275 formed in a cam 276 secured to and rotatable with the vertical shaft 40. The cam 276 is timed to actuate the fingers 237 in cooperation with the cams 254 and 255 to obtain the resultant movements thereof, as above described.

The products 16, 17 and 18 after being ejected, and when engaged by the fingers 237, are guided from one station to the next succeeding one along the lower bolster section 59 by a vertically disposed elongated plate 277 (see Figs. 14 and 16) which is supported upon the frame portion 142 by bolts 278, which extend through said frame portion. A small coiled spring 279 adjacent each bolt 278 reacts between the plate 277 and the frame portion 142 to urge the plate forwardly (Fig. 16). The forward movement of the plate 277 is limited by nuts 280 screwed on the outer ends of the bolts 278. The nuts 280 rest against the upper ends of rocking lever arms 281 which are secured to a horizontal shaft 282. A forwardly directed slide bar 283 mounted at the end of the bolster section 59 is connected to an arm 284, see Figs. 3 and 16, which arm is secured on the end of the shaft 282. The slide bar 283 is provided at its forward end with rack teeth 285 which are in mesh with a gear segment 286 (see Figs. 14 and 16) secured upon the lower end of the pivot pin 261 to rock therewith when the bell-crank 259 is oscillated by the cam 276. The rocking of the lever arms 281 by the cam 276, as above described, causes the guide plate 277 to move rearwardly to avoid possible interference with the products as they are being ejected.

*Safety control to stop machine*

The machine is adapted to be instantly stopped in case a jam should occur due to mutilated or cramped products being formed at any station of the machine, and the means for so stopping the machine includes an elongated rod 287 (see Figs. 1, 10, 11 and 17)—said rod being connected to the lower end of the clutch lever 188 in which it is rotatively mounted by a bushing 288 pivoted to the lever 188. A releasing knob 289 is secured upon the end of the rod 287 adjacent the bushing 288. A spring 290 extending peripherally about the rod 287 and disposed in a groove 291 provided in the bushing 288 is connected at one end to a pin 292 on the rod 287 and at the other end to a pin 293 in the bushing 288. The spring 290 is tensioned to maintain the knob 289 and the bushing 288 normally in such a position that a catch member 294 secured upon the other end of the rod 287 will be engaged by a retractable detent 295 to hold the clutch lever 188 against movement in a clutch releasing direction under the urge of a spring 296 acting on the arm 193 (see Figs. 4 and 8).

The retractable detent 295 overlies the end of the catch member 294 when the clutch 26 is in machine-operating or closed position, and said detent is adapted to pass through a notch 297 formed in the end of the catch member 294 when the latter is rotated by the knob 289 against the tension of the spring 290. This will permit the rod 287 to slide under the action of the spring 296 and swing the clutch lever 188 to open the clutch 26 and tighten the brake band 198 about the drum 199 to suddenly stop the machine. The detent 295 is normally maintained in the path of the catch member 294 by a spring 298 coiled about a rod 299 secured to and extending from the detent 295 rearwardly toward and through spaced apart lugs 300 and 302 formed on a bracket 301 secured to and extending forwardly from the bracket 218 which supports the catch member 294 at the end of the rod 287. The rear end 303 of the rod 299 extends beyond the lug 302 and is straddled by the bifurcated end of an arm 304 secured to a vertical rock shaft 305. The arm 304, when rocked by the shaft 305 in one direction, engages a nut 306 threadingly adjustable on the end 303 of the rod 299 to retract the rod and draw the detent 295 out of the path of the catch member 294. The shaft 305 is journaled at its upper end in the bracket 301 and at its lower end in a bracket 307 secured to the bracket 218.

When a product disposed in the path of any one of the pushers 206-210, inclusive, becomes stuck, due to being distorted, or if for any other reason it is prevented from being moved by the pusher, the clamped rear end of the respective pusher which is being held by the product will slip through the friction holding means constituted by the spring-pressed plate 212 and the parts associated therewith, and will remain in this protruding position by friction (as shown in dotted lines in Fig. 11), when the slide 211 with all of the pushers is retracted by the cam 227. The rearwardly protruding pusher will then engage the corresponding one of a series of trip fingers 308-312 which are secured to the rock shaft 305 with their free ends disposed in line with the path of the rearward movement of the pushers 206-210 respectively. Consequently, the protruding finger will rock the shaft 305 and withdraw the detent 295 as above described, resulting in the sudden automatic stopping of the machine.

In order to stop the machine in the event that interference is experienced in transferring products between the stations 6-9, inclusive, of the straight line section of the machine, provision is made of a finger 313 secured on the rock shaft 305 and disposed in the path of an arm 314 extending upwardly from an elongated partially tubular trip lever 315 pivoted at each end to the bracket 307 on pivot points 316. The trip lever 315 has a forwardly extending plate-like portion 317 (Fig. 15) which rides on the top of the spring pressed pin 248. The arrangement is such that when the attempted movement of a product by the fingers 237 is interfered with, the lower end of the pin 248 will be forced out of the notch 249 in the end of the rod 243, and will cause the trip lever 315 to be rocked, which in turn, through the arm 314, will rock the shaft 305 to withdraw the detent 295. These parts will be automatically restored to their normal operating position by the spring 243a which will slide the rod 243 and permit the pin 248 to snap into the notch 249, thus releasing the trip lever 315.

Figures 19, 20:
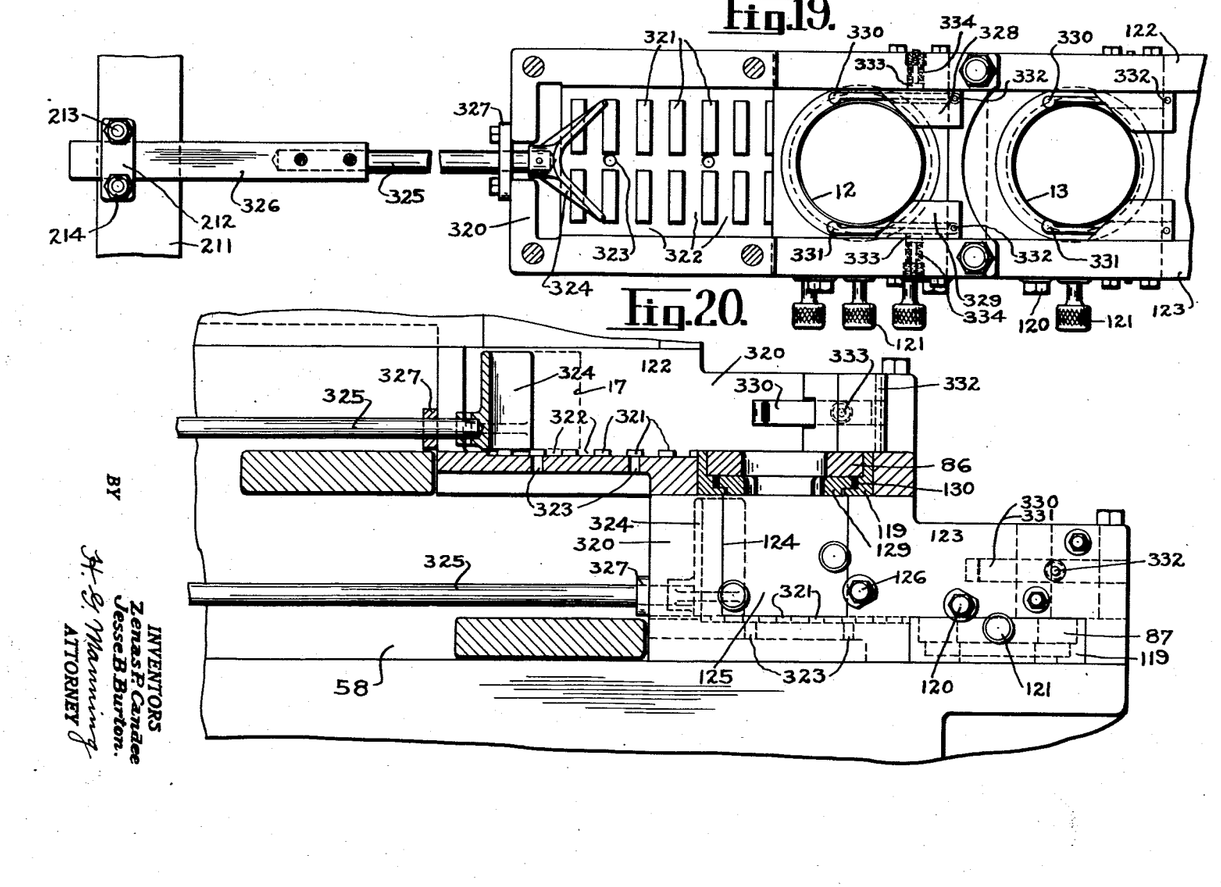
Fig. 19 is an enlarged top plan view of modified forms of die block and pusher bar.
Fig. 20 is a side view of two sets of the modified die blocks and pusher bars, the upper set being shown in section.

In order to provide means to carry away chips, dirt and lubricant, and to insure a more accurate positioning of the products at the various stations, the modified form of die block and pusher bar shown in Figs. 19 and 20 will in some instances be preferable for use instead of that previously described. In this form, the die blocks 320 are provided with a series of raised parallel rectangular pads 321 arranged in two separated rows at one end upon the upper surface beneath the preceding die and upon which the product therefrom rests after it has been forced through said preceding die. Recesses 322 are provided between the pads 321 to permit the chips, dirt, etc. to be readily carried away by the lubricant and escape through openings 323 in the base of said die block 320, whereby the upper surface of the pads 321 upon which the product is disposed will be kept clean.

In association with the modified die blocks 320, a modified form of pusher bar is also provided having a forked member 324 secured upon the end of a horizontal rod 325 which in turn is connected to a flat bar 326 held in position by the clamp plates 212 and the slide 211 as in the previous form. The forked members 324 are adapted to engage the product at each side thereof, and each one is of substantially the same height as the product at the respective station. The rod 325 is guided by passing through a block 327 secured to the end of the die block 320.

When the product has been pushed to the right by the forked member 324 into alinement with the next punch and die, it will engage a pair of stop blocks 328 and 329 and be held firmly thereagainst by lateral spring actuated headed fingers 330 and 331. The fingers 330 and 331 are pivoted at 332 and are acted upon by a pair of opposed plungers 333 which are urged inwardly by coiled springs 334. The fingers 330 and 331 serve to frictionally hold the product in proper position and prevent any tendency for said product to return to the left with the forked member 324 when the latter is retracted, due to possible adherence of the product to the forked member caused by sticky lubricant.

*Operation*

In operation, the blanks or cups 10 will be fed to the machine down the inclined feed chute 203 by gravity, the lower cup being located in front of the upper pusher 206, whereby it will be moved under the first punch 77 to be drawn thereby through the die 80 at the first stroke of the machine. The product 11 drawn by the first punch 77 and die 80 will be then disposed below the first die 80 resting upon the upper surface of the second die block 63 between the guide plates 228 and 229 and in the path of the second pusher 207 (see Fig. 13).

On the second stroke of the machine, the pusher 207 will move the product 11 beneath the second punch 78 so that it will be forced thereby through the second die 81. On the next stroke of the machine, the pusher 208 moves the product 12 beneath the third punch 79 along the top face of the third die block 64 and between the guide plates 228 and 229 associated therewith. On the next stroke of the machine the product 13 will be moved by the pusher 209 to a position between the fourth punch 83 and die 86 along the upper surface of the fourth die block 65. The product 14 is then engaged by the fifth pusher 210 and moved beneath the fifth punch 84 to be forced thereby through the die 87 upon the upper surface of the lower bolster section 59 in front of the guide plate 277.

It will be understood that the can holding sleeves 165-169 will enter the products drawn by the respective punches 77, 78, 79, 83 and 84 before the next succeeding punch acts thereon, and said products will be held securely in position by said sleeves during the punching operation. During the pushing operations, the products will be limited in their movements and stopped in position beneath the respective punches by the stop plates 230 and 231 (Fig. 13). If any product, due to its becoming accidentally distorted or otherwise damaged, should become stuck in the machine, the corresponding pusher 206-210 will slip at its connection with the slide 211 (Fig. 11), and upon its return stroke, will engage one of the trip fingers 308-312 disposed in its path, and cause rotation of the vertical shaft 305. The detent 295 will thus be retracted from the position shown in Fig. 17, permitting the spring-pressed rod 287 to move in the direction indicated in dotted lines to actuate the clutch 26 through the clutch lever 188 and arm 193, and thus suddenly stop the machine. This safety feature prevents breakage of the punches, dies, or other parts of the machine.

Each of the products 11, 12, 13, 14 and 15 will be stripped from its respective punch by the stripper rings 129 associated with each of the respective dies, as best illustrated in Fig. 18. The stripper rings 129 are assisted in their action by the compressed air mechanism, above described.

After the product 15 has been forced through the fifth die 87 and upon the upper surface of the lower bolster section 59, the finger operating shift bar 238 and the rod 243 will cause the double arm fingers 237 to engage the product 15 and move it along the bolster 59 to a position beneath the sixth punch 85 whereupon the sleeve 170 will enter the product 15 and hold it while the punch 85 forces the product through the die 88.

When the sixth punch 85 rises, the first knockout rod 143 will engage the product 16 and raise it from the die 88 upwardly against the stripper ring 140. The double arm fingers 237 will then move the product 16 beneath the seventh punch 89, which will draw the product 16 in the die 92. The second knockout rod 143 will force the product 17 through the die and the product will be stripped from the punch 89 by the stripper ring 140. The product 17 will then be moved to a position beneath the bottom forming punch 90 by the next set of fingers 237. The product 18 after being drawn in the die 93 will be ejected therefrom by the knock-out rod 143, and stripped from the punch 90 by the stripper ring 140 cooperating therewith. The product 18 will then be moved by the next set of transfer fingers 237 to a position in between the cutting off punch 91 and the die 94 which cooperate to trim off the scrap rim 20 at the top of the shell 19. The completed shell 19 will pass down through the die 94 and will drop into the delivery chute 95 below it while the scrap rim 20 is being stripped from the punch 91 by the stripper ring 140 and then blown into the scrap chute 157 by a blast of compressed air.

It will be understood that if any of the products 15, 16, 17, 18 and 19 become stuck and the fingers 237 are unable to freely move them, all of said fingers 237 will be held stationary, and the shift bar 238 prevented from being moved by the cam 254. The spring-pressed pin 248 will thus be caused to ride out of the notch 249 in the bar 238 and engage the overhanging portion 317 of the trip lever 315 to rock the latter upon its pivots 316. The rocking of the trip lever 315 will cause the arm 314 to engage the finger 313 to rock the shaft 305, whereby the detent 295 will be retracted to release the clutch 26 and stop the machine, as above described (see Fig. 17).

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a redraw press, a plurality of sets of cooperating punches and dies, a crank shaft for reciprocating said punches in unison, means to drive said crank shaft, means to stop said crank shaft driving means, said dies being successively stepped down, product pushers for simultaneously moving the products from each die to the next succeeding one, and means adapted to be operated by any one of said pushers to actuate said stopping means whenever a product becomes stuck between one die and the next succeeding one.

2. In a redraw press, a plurality of units, each unit comprising a plurality of sets of cooperating punches and dies disposed between a pair of adjacent upright frame members, a common crank shaft for all of said units having separate crank portions at each unit by which all the punches of said unit are reciprocated, a source of power, a clutch to connect said crank shaft to said source of power, slidable transfer members to feed the products from each set of punches and dies to the next succeeding set, a vertical shaft driven from said crank shaft, cam means actuated by said vertical shaft to slide all of said transfer members in unison, and means adapted to be actuated by any one of said transfer members to release said clutch to disconnect said crank shaft from said source of power whenever the product of the preceding die becomes stuck below said die.

3. In a redraw press, a plurality of units, each unit comprising a plurality of sets of cooperating punches and dies disposed between a pair of upright frame members, a common crank shaft for all of said units having separate crank portions at each unit by which the punches of this unit are reciprocated, a die block for holding each die, a bolster section for supporting said die blocks, said bolster section having regularly stepped down die block seats, each of said die blocks seated on said bolster section having a portion underlying the next preceding die block and a surface to receive a product therefrom, and means to slide the product received on the surface of each die block along said block to the die held thereby, the surface of each of said die blocks having a plurality of raised ribs with grooves formed between said ribs, said blocks being provided with an opening leading from one of said grooves and through said block to drain lubricant therefrom.

4. In a shell drawing press, a plurality of die blocks located in staggered stepped down relationship, each die block having a portion underlying the next preceding die block, each of said portions being provided with a plurality of raised product receiving ribs with depressions between the same and an opening leading from the depressions and passing down through said die block portion to automatically remove lubricant therefrom.

5. In a redraw press, a plurality of cooperating punches and dies, a plurality of regularly staggered stepped down die blocks, one for holding each die, a slidable member for moving the products from each die along the die block holding the next succeeding die, means to reciprocate said punches, a power source, releasable means to connect said punch reciprocating means to the source of power, a reciprocable slide actuated in timed relation with the reciprocation of said punches, means to yieldingly connect each of said product moving slidable members to said slide whereby interference with the forward movement of any product moving member will cause the same to stop while the slide and the other slidable members continue, and means actuated by the rearward movement of said stopped product moving slidable member to actuate said releasable means to disconnect said punch reciprocating means from said source of power.

6. In a redraw press, a plurality of sets of cooperating punches and dies, a source of power, releasable means connected with said source of power to reciprocate said punches, a plurality of cam-operated slidable members adapted to move the products from each set of punches and dies to the next succeeding set, means to disconnect said releasable means from said source of power, and means responsive to the obstruction of any one of said slidable members to actuate said disconnecting means.

7. In a redraw press, a plurality of sets of cooperating punches and dies, a source of power, releasable means connected with said source of power to reciprocate said punches, a slidable member adapted to move a product from one set of punches and dies to the next succeeding set, means to disconnect said releasable means from said source of power, and means actuated by said slidable member in case the forward movement of said slidable member should be interfered with to operate said disconnecting means.

8. In a redraw press, a plurality of sets of cooperating punches and dies, a source of power, means releasably connected with said source of power to reciprocate said punches, including a plurality of cam-operated slidable members adapted to move the product from each set of punches and dies to the next succeeding set, respectively, a rod for disconnecting said source of power from said punch reciprocating means when moved in one direction, a catch disposed in position to prevent such movement of said rod, said slidable product moving members being connected to said catch, and means responsive to the obstruction of any one of said slidable members to release said catch and disconnect said punch reciprocating means from said source of power during its rearward movement.

9. In a redraw press, a plurality of sets of cooperating punches and dies, a source of power, releasable means connected with said source of power to reciprocate said punches, a plurality of slidable members adapted to move the product from each set of punches and dies to the next succeeding set respectively, a rod connected to said releasable means to release the same when said rod is moved in one direction, a retractable catch disposed in position to prevent such movement of said rod, each of said slidable product moving members being so connected to said catch as to retract the same in case the forward movement of any one of said slidable product moving members should be impeded.

10. In a shell drawing press, in combination, a punch, a die, a die holding block having a product receiving surface in horizontal alinement with the face of said die, a slidable member to feed a product received on said surface into vertical alinement with said die, said member having a forked end to engage the product at spaced points thereon, a stop to limit the movement of the products and insure alinement with said die, and a pair of spring pressed fingers to frictionally engage said product and hold it in alined position with the die while the punch is operating thereon.

11. In a product drawing press, a source of power, a cooperating punch and die, means to reciprocate said punch through said die to draw a product therein, releasable means to connect and disconnect said punch reciprocating means with said source of power, a slidable member to remove the product after it has been drawn by said punch and die, and means actuated by said slidable member to operate said releasable member to disconnect said punch reciprocating means from said source of power when movement of said slidable member is obstructed.

12. In a shell drawing press, a plurality of horizontally alined dies, a like number of reciprocable punches associated with said dies, means to eject the products from said dies, slidable members to transfer said products from one die to the next succeeding die, means to slide said members in timed relation with the reciprocation of said punches, said member sliding means including a horizontally slidable bar, a pivoted bell crank, a rod connected to one arm of said bell crank, said bar being slidably connected to the other arm of said bell crank, cam means to slide said bar, cam means to move said rod to rock said bell crank upon its pivot, a vertically disposed plate extending from the first of said dies to the last for guiding the products as they are moved by said members, and means actuated by said bell crank to move said plate away from said dies as products are being ejected therefrom.

13. In a redraw press having a plurality of staggered regularly stepped down dies, die holding blocks in the front portion of which said dies are mounted, a bolster having regularly stepped down seats to support said die holding blocks, each block having a rear portion adapted to underlie the front portion of the next preceding block and presenting a product receiving support below the preceding die, said support being formed of spaced apart raised ribs and an opening through said block to permit lubricant to flow therefrom.

14. In a redraw press having a plurality of staggered regularly stepped down dies, die holding blocks in the front portion of which said dies are mounted, a bolster having regularly stepped down seats to support said die holding blocks, each block having a rear portion adapted to underlie the front portion of the next preceding block and presenting a product receiving support below the preceding die, said support being formed of spaced apart raised ribs and an opening through said block to permit lubricant to flow therefrom, a forked pusher member adapted to engage and slide a product received on the support of each block into alined position with the die held thereby, and stop members to limit the movement of the product by said forked member.

15. In a redraw press having a plurality of staggered regularly stepped down dies, a like number of die holding blocks in the front portion of which said dies are mounted, a bolster having regularly stepped down seats to support said die holding blocks, each block having a rear portion adapted to underlie the front portion of the next preceding block and presenting a product receiving support below the preceding die, said support being formed of spaced apart raised pads, said block having openings to permit lubricant to flow therefrom, a forked pusher member adapted to engage and slide a product received on the support of each block into alined position with the die held thereby, stop members to limit the movement of the product by said forked member, and spring pressed fingers adapted to embrace each product and hold it frictionally in alinement with said die.

16. In a redraw press, a plurality of sets of cooperating punches and dies arranged in a line, a crank shaft for reciprocating said punches, plate members, means to drive said crank shaft, the dies being successively stepped down and each being supported by a removable plate member, a die block having a recess extending across the same to laterally receive said plate member, side members extending upwardly from said die block to support the next above plate member, and means to removably retain said plate member in said recess in position to be supported by said die block side members.

17. In a redraw press, a plurality of sets of cooperating punches and dies arranged in a line, a crank shaft for reciprocating said punches, plate members, means to drive said crank shaft, the dies being successively stepped down and each being supported by a removable plate member, a die block having a recess extending across the same to laterally receive said plate member, side members extending upwardly from said die block to support the next above plate member, a removable plate in one of said side members on said block to permit removal of injured products therefrom, and means to removably retain said plate member in the recess in said die block in position to be supported by said die block side members.

18. In a redraw press, a plurality of units, each unit comprising a plurality of sets of cooperating punches and dies disposed between a pair of upright frame members, means at the top of said frame members to space them apart, a base plate extending between, supported by, and secured to each frame member, a first bolster section supported on said base plate, the dies of one unit being arranged on the same level with and supported by said first bolster section, a second bolster section supported by said first bolster section, the dies of another unit being arranged in stepped down relation with and supported by said second bolster section, and a common crank shaft for all of the units and extending across all of said frame members.

19. In a redraw press, a plurality of juxtaposed units, each unit comprising a plurality of sets of cooperating punches and dies disposed between a pair of upright frame members, a common crank shaft for all of said units and having separate crank portions at each unit by which the punches of the respective units are reciprocated, a bolster section having a series of stepped down supporting surfaces, a die block supported on each of the stepped down surfaces of said bolster section and having a portion overhanging the next below surface, each die block having a rearwardly extending portion disposed beneath the overhanging portion of the next upper die block to support the same, and a die in each die block disposed to be supported by the rearwardly extending portion of the next below die block.

20. In a redraw press, a plurality of juxtaposed units, each unit comprising a plurality of sets of cooperating punches and dies disposed between a pair of upright frame members, a common crank shaft for all of said units and having separate crank portions at each unit by which the punches of the respective units are reciprocated, a bolster section having a series of stepped down supporting surfaces, a die block supported on each of the stepped down surfaces of said bolster section and having a portion overhanging the next below surface, each die block having upwardly extending side portions extending rearwardly to beneath the overhanging portion of the next upper die block to support the same, each die block having a recess extending across the overhanging portion thereof, and a die in the recess of each die block and disposed therein to be supported by the rearwardly extending side portions on the next below die block.

21. In a shell redrawing press, a plurality of horizontally alined dies, a plurality of reciprocable punches associated with said dies, means to upwardly eject the drawn products from said dies, a member slidable in alinement with said dies to move the products from one die to the next succeeding one, a vertically disposed plate extending from the first of said dies to the last one to be engaged by and to guide the products as they are moved by said slidable member, and means to slide said member after the products have been ejected and to move said plate away from the dies before the products are ejected.

ZENAS P. CANDEE.
JESSE B. BURTON.